United States Patent [19]
Harris et al.

[11] 3,806,203
[45] Apr. 23, 1974

[54] ANTI-SKID BRAKING SYSTEM FOR VEHICLE WITH ALLOWANCE FOR THE TYPE OF ROAD SURFACE

[75] Inventors: Paul Anthony Harris, Walsall; David Gordon Williams, Harborne, both of England

[73] Assignee: Joseph Lucas (Industries) Limited, Birmingham, England

[22] Filed: July 22, 1971

[21] Appl. No.: 165,184

[30] Foreign Application Priority Data
July 28, 1970 Great Britain.................. 36416/70

[52] U.S. Cl. ...................... 303/21 CG, 188/181 A
[51] Int. Cl................................................ B60t 8/12
[58] Field of Search ........... 188/181 A; 303/20, 21; 324/162; 340/262

[56] References Cited
UNITED STATES PATENTS

| | | | |
|---|---|---|---|
| 3,398,995 | 8/1968 | Martin | 303/21 BE |
| 3,532,392 | 10/1970 | Scharlack | 303/21 BE |
| 3,552,803 | 1/1971 | Lucien | 303/21 BE |
| 3,609,313 | 9/1971 | Lucien | 303/21 CG X |
| 3,584,921 | 6/1971 | Crawford | 303/21 BE |

*Primary Examiner*—Duane A. Reger
*Assistant Examiner*—Stephen G. Kunin

[57] ABSTRACT

A vehicle braking system for minimising the risk of skidding has a generator driven by a wheel for producing an electrical signal representing the angular speed of the wheel, this signal then being differentiated to produce a signal representing acceleration or deceleration. The brakes are released when the output of the differentiating circuit reaches a predetermined value, and at the point of release of the brakes the output of the differentiating circuit is clamped. The differentiating circuit includes an input capacitor and a feedback resistor which acts as a memory to monitor loss of wheel speed during the period between initiation of the release of the brakes and initiation of the re-application of the brakes. The memory permits unclamping of the differentiating circuit output and re-application of the brakes in a manner dependent on the monitored wheel speed loss signal.

1 Claim, 1 Drawing Figure

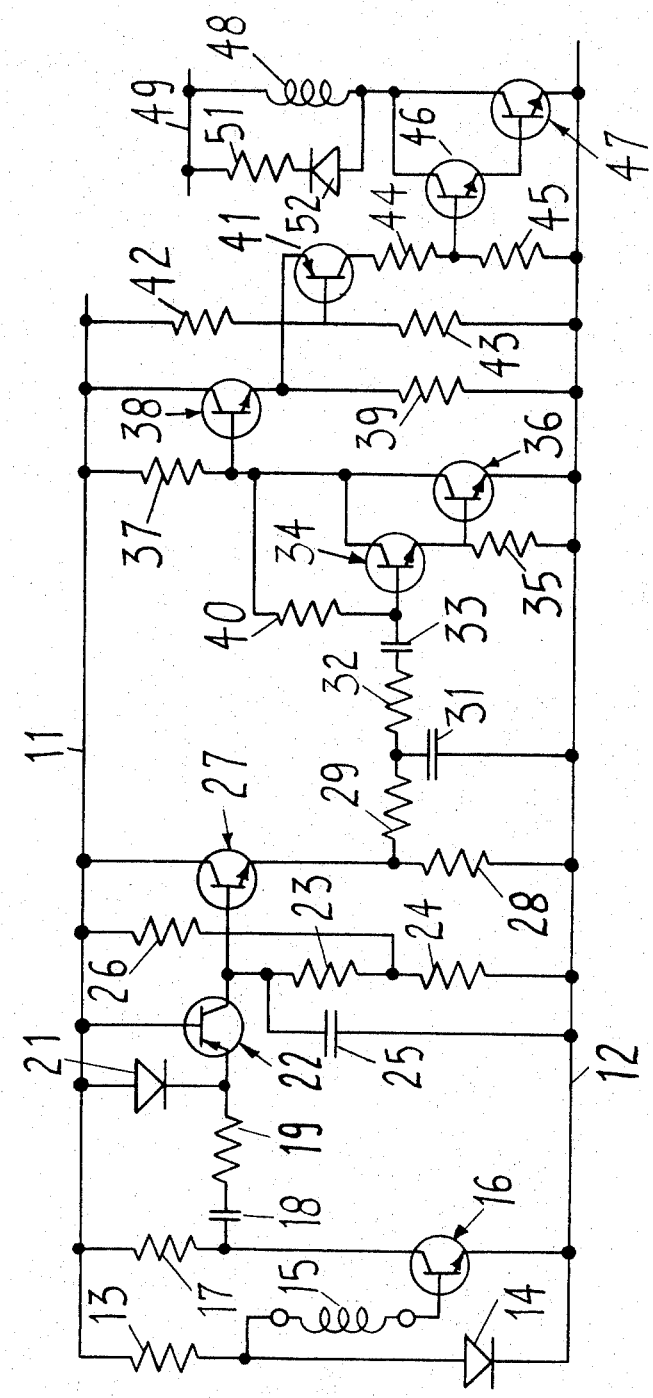

ANTI-SKID BRAKING SYSTEM FOR VEHICLE WITH ALLOWANCE FOR THE TYPE OF ROAD SURFACE

This invention relates to braking systems for vehicles, of the kind in which the brakes of a vehicle are released automatically in order to minimise the risk of skidding.

The usual arrangement in systems of this kind is to release the brakes when the deceleration of a wheel exceeds a predetermined value. By way of example, in the case of a car on a good road surface, the deceleration of the car can rarely exceed 1.2 g., so that a value of wheel deceleration in excess of this value means that the wheel is decelerating faster than the car, and so will stop rotating before the car has stopped. In order to avoid the resultant skidding, a value of wheel deceleration can be set, by way of example, 1.5 g., and the brakes released at this value, so minimising the risk of skidding.

In known systems there is difficulty in deciding when to re-apply the brakes. If the surface over which the wheel is moving is slippery, then the wheel will accelerate slowly, and if a short time delay is employed, the brakes will be re-applied before the wheel reaches a satisfactory rolling speed, and this cycle will continue and quite probably result in skidding. If a longer time delay is employed to allow time for the wheel to accelerate to a satisfactory rolling speed in the worst road conditions, then braking time is lost when the vehicle is on a good surface, because on a good surface the wheel will reach a satisfactory rolling speed well within the time delay period.

The object of the invention is to provide a system in which a variable time delay is used, this time delay bearing a relationship with the quality of the road surface.

The invention resides in a braking system for a wheel of a vehicle, comprising in combination a generator driven by the wheel for producing an electrical signal representing the angular speed of the wheel, a differentiating circuit to which said signal is applied, the differentiating circuit producing an output representing the rate of change of angular speed of the wheel, means for initiating the release of the braking effort applied to said wheel when the output of the differentiating circuit reaches a predetermined value, and means for clamping the output of the differentiating circuit when said predetermined value is reached, said differentiating circuit including an input capacitor and a feedback resistor which, when the output of the differentiating circuit is clamped, act as a memory to monitor loss of wheel speed during the period between initiation of the release of braking effort and initiation of its re-application, the memory permitting unclamping of the differentiating circuit output and re-application of the brakes in a manner dependent on the monitored wheel speed loss signal.

If the memory were perfect, the differentiating circuit would be unclamped when the wheel speed was restored to the value of wheel speed at which release of the brakes had been initiated. However, bearing in mind that the other wheels of the vehicle are also being braked, this wheel speed will not in general be restored, and so in the preferred embodiment means are provided to give a controlled memory loss in the clamped condition, so that the differentiating circuit will be unclamped at a slightly lower wheel speed. In this case it is conveniently arranged that the means for releasing the brakes also clamps the differentiating circuit. However, the effect of the memory loss can be achieved in other ways. For example, the means for clamping the differentiating circuit could be bistable, with a difference in on and off switching voltages such that the rate of memory loss is different from that resulting from the above mentioned arrangement.

Preferably, the differentiating circuit is constituted by an operational amplifier in conjunction with a feedback resistor and input capacitor.

The accompanying drawing is a circuit diagram illustrating one example of the invention.

Referring to the drawing, there are provided positive and negative supply lines 11, 12 the line 12 conveniently being grounded. Connected in series between the lines 11, 12 are a resistor 13 and a diode 14, the junction between which is connected to a pick-up winding 15 to the base of an n-p-n transistor 16, the emitter of which is connected to the line 12 and the collector of which is connected to the line 11 through a resistor 17. The collector of the transistor 16 is further connected to the line 11 through a series circuit including a capacitor 18, a resistor 19 and a diode 21, while the junction between the resistor 19 and 21 is connected to the emitter of a p-n-p transistor 22. The base of the transistor 22 is connected to the line 11, and its collector is connected to the resistors 23 and 24 in series to the line 12. The resistors 23, 24 are bridged by capacitor 25, and the junction of the resistors 23, 24 is connected through a resistor 26 to the line 11.

The collector of the transistor 22 is also connected to the base of an n-p-n transistor 27, the collector of which is connected to the line 11 and the emitter of which is connected to the line 12 through a resistor 28. The emitter of the transistor 27 is further connected through a resistor 29 and a capacitor 31 in series to the line 12, the junction of the resistor 29 and capacitor 31 being connected to a resistor 32 and a capacitor 33 in series to the base of an n-p-n transistor 34, the emitter of which is connected to the line 12 through a resistor 35. The emitter of the transistor 34 is also connected to the base of an n-p-n transistor 36, the emitter of which is connected to the line 12, and the collector of the transistors 34 and 36 are connected through a resistor 37 to the line 11. The junction of the collectors of the transistors 34 and 36 and the resistor 37 is connected to the feedback resistor 40 at the base of the transistor 34, and this junction is also connected to the base of an n-p-n transistor 38, the collector of which is connected to the line 11 and the emitter of which is connected to the line 12 through a resistor 39. A further connection is taken from the emitter of the transistor 38 to the emitter of a p-n-p transistor 41, the base of which is connected to the lines 11 and 12 through resistors 42 and 43 respectively, and the collector of which is connected to the line 12 through a pair of resistors 44, 45 in series.

The junction of the resistors 44, 45 is connected to the base of an n-p-n transistor 46, the emitter of which is connected to the base of an n-p-n transistor 47 having its emitter connected to the line 12. The collectors of the transistors 46 and 47 are connected through a solenoid winding 48 to another positive supply line 49, and the winding 48 is bridged by a resistor 51 and a diode 52 in series. When the winding 48 is energised, it releases the brakes of the vehicle.

The arrangement described is particularly intended for use in a car or other road vehicle, where there will be one set of components as illustrated for each wheel. The wheel drives a toothed rotor or any other convenient means for producing in the winding 15 pulses at the frequency of the wheel. These pulses turn the transistor 16 on and off, and the resultant wave form at the collector of the transistor 16 operates through the transistor pump circuit including transistor 22 and transistor 27 to produce across the capacitor 31 a voltage representing the angular speed of the wheel. The capacitor 25 and the resistors associated therewith serve to smooth the signal.

The voltage across the capacitor 31 is applied to a differentiating circuit consisting of an operational amplifier having transistors 34 and 36, together with a feedback resistor 40 and an input capacitor 33. The differentiating circuit operates to produce at its output terminal, that is to say the collector of the transistor 36, a signal representing the rate of change of speed of the wheel.

Assuming that the brakes are applied to the wheel, then initially the transistors 34 and 36 will be conducting sufficiently to hold the transistor 41 off, so that the transistor 34 is off and no base current is supplied to the transistors 46 and 47, so that the winding 48 is not energised.

The arrangement is such that provided the deceleration does not exceed what is regarded as a safe value, that is a value such that slipping of the wheel is unlikely to occur, then the transistor 41 never turns on. However, if the safe declaration is exceeded, the differentiating circuit operates to turn on the transistor 41, which in turn switches on the transistors 46 and 47 to energise the winding 48 and release the brakes. It will be noted that there is inevitably a delay between the turning on of the transistor 41 and the removal of the braking effort on the wheel. However, as soon as the transistor 41 turns on, the collector of the transistor 36 is connected to the low impedance potential divider constituted by resistors 42 and 43 through two diodes in series, the diodes being constituted by the base-emitter of the transistor 38 and the emitter-base of the transistor 41. All the time the amplifier is operating as a differentiating circuit, the right hand plate of the capacitor 33 is held at a constant potential in the usual way. However, when the collector of the transistor 36 is connected to the potential divider as described, the output of the operational amplifier is clamped, and the operational amplifier ceases to operate as a differentiating circuit. The right hand plate of the capacitor 33 is now free to swing in voltage as the voltage of the left hand plate changes, and bearing in mind that there is a delay between turning on of the transistor 38 and removal of the brakes, the right hand plate of capacitor 33 will assume a potential representing approximately the loss in speed of the wheel after the transistor 41 turns on. After the brakes are removed, the wheel speed will accelerate towards its prior value, and the operational amplifier will start to act as a differentiating circuit again when the voltage on the right hand plate of the capacitor 33 reaches the value which it assumed when the transistor 41 was turned on.

The potential at the right hand plate of capacitor 33 is determined both by the loss of speed signal, appearing across resistor 40 as a result of A.C. coupling by capacitor 33 to the speed signal and by the deceleration threshold signal (the clamped voltage level at the output of the operational amplifier), applied via resistor 40 and integrated by capacitor 33. This integrated deceleration threshold signal may be regarded as a virtual speed signal having an initial value zero and accelerating at the threshold rate. This signal is additively combined with the loss of speed signal, giving a resultant which returns to zero before the loss of wheel speed has been fully restored.

It will be perceived that this signal combination effectively compares the loss of wheel speed with the loss of speed which would have resulted if the wheel had decelerated constantly at the threshold value of deceleration. This feature makes liberal allowance for the loss of vehicle speed meantime and also ensures that the brakes can be reapplied after a brief delay if the vehicle has meantime come to rest.

It will be appreciated that the foregoing assumes, for simplicity, that capacitor 33 and resistor 40 act as a perfect a.c. coupler and integrator. In practice, only a moderately long time constant need be used in order to avoid excessive distortion of the signals.

We claim:

1. A braking system for a wheel of a vehicle, comprising in combination a generator driven by the wheel for producing an electrical signal representing the angular speed of the wheel, a differentiating circuit including a first transistor to the base of which said signal is applied by way of an input capacitor, a second transistor having its base connected to the emitter of the first transistor, the collectors of the first and second transistors being interconnected and providing an output from the differentiating circuit, and a resistor coupling the collectors of the first and second transistors to the base of the first transistor, a further transistor having its base coupled to the collectors of the first and second transistors, said further transistor being turned on when the deceleration of the wheel reaches a predetermined value, switching means operable when said further transistor conducts for initiating the release of the braking effort applied to said wheel, a potentiometer chain providing a source of fixed potential, and means operable when said further transistor conducts for coupling the collectors of said first and second transistors to said potentiometer chain to clamp the collector voltages of said first and second transistors, whereby the voltage on said capacitor is controlled so that the brakes are reapplied at a point in time dependent upon the nature of the road surface.

* * * * *